(12) United States Patent
Roehm

(10) Patent No.: US 10,589,661 B2
(45) Date of Patent: Mar. 17, 2020

(54) METHOD FOR THE OPEN-LOOP CONTROL OF THE FRONT LIGHT DISTRIBUTION OF A VEHICLE

(71) Applicant: DAIMLER AG, Stuttgart (DE)

(72) Inventor: Klaus Roehm, Herrenberg (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/463,463

(22) PCT Filed: Nov. 2, 2017

(86) PCT No.: PCT/EP2017/001275
§ 371 (c)(1),
(2) Date: May 23, 2019

(87) PCT Pub. No.: WO2018/103875
PCT Pub. Date: Jun. 14, 2018

(65) Prior Publication Data
US 2019/0351818 A1     Nov. 21, 2019

(30) Foreign Application Priority Data
Dec. 9, 2016  (DE) .......................... 10 2016 014 708

(51) Int. Cl.
*B60Q 1/08* (2006.01)
*B60Q 1/00* (2006.01)

(52) U.S. Cl.
CPC ........... *B60Q 1/085* (2013.01); *B60Q 1/0023* (2013.01); *B60Q 2300/45* (2013.01); *B60Q 2400/20* (2013.01)

(58) Field of Classification Search
CPC .. B60Q 1/085; B60Q 1/0023; B60Q 2300/45; B60Q 2400/20
USPC .......................................................... 315/82
See application file for complete search history.

(56) References Cited

U.S. PATENT DOCUMENTS

| 9,623,793 B2 | 4/2017 | Langkabel et al. |
| 10,189,402 B2 | 1/2019 | Asaoka |
| 2008/0043099 A1* | 2/2008 | Stein ...................... B60Q 1/143 348/118 |
| 2014/0214260 A1 | 7/2014 | Eckert et al. |
| 2017/0083774 A1* | 3/2017 | Solar ........................ G06K 9/46 |

(Continued)

FOREIGN PATENT DOCUMENTS

| DE | 1020100048659 A1 | 4/2012 |
| DE | 102012015618 A1 | 2/2014 |
| DE | 102013213064 A1 | 1/2015 |

(Continued)

OTHER PUBLICATIONS

Examination Report dated Sep. 7, 2017 in related/corresponding DE Application No. 10 2016 014 708.3.

(Continued)

*Primary Examiner* — Don P Le
(74) *Attorney, Agent, or Firm* — Patent Portfolio Builders PLLC

(57) ABSTRACT

A method for the open-loop or closed-loop control of the front light distribution of a vehicle having headlamps that can be changed with respect to the light distribution involves producing a different light distribution during an at least partially autonomous driving operation of the vehicle than during operation with a person driving the vehicle.

14 Claims, 2 Drawing Sheets

(56) References Cited

U.S. PATENT DOCUMENTS

2017/0322760 A1* 11/2017 Soh .................. B60R 11/0235
2018/0136643 A1* 5/2018 Tao .................. G05D 1/0022

FOREIGN PATENT DOCUMENTS

| DE | 102013214481 A1 | 1/2015 |
| DE | 102014011811 A1 | 2/2016 |
| DE | 102014226254 A1 | 6/2016 |
| DE | 102015200859 A1 | 7/2016 |
| DE | 102015001912 A1 | 8/2016 |
| WO | 2013034142 A1 | 3/2013 |
| WO | 2015194345 A1 | 12/2015 |

OTHER PUBLICATIONS

International Search Report dated Feb. 7, 2018 in related/corresponding International Application No. PCT/EP2017/001275.
Written Opinion dated Feb. 7, 2018 in related/corresponding Application No. PCT/EP2017/001275.

* cited by examiner

METHOD FOR THE OPEN-LOOP CONTROL OF THE FRONT LIGHT DISTRIBUTION OF A VEHICLE

BACKGROUND AND SUMMARY OF THE INVENTION

Exemplary embodiments of the invention relate to a method for the open-loop control of the front light distribution of a vehicle.

Vehicles comprising front headlights for generating a defined front light distribution are known from the general prior art. Conventional vehicles typically have two different front light distributions at their disposal, known as the low beam and the high beam, which has a greater reach than the low beam in terms of its light distribution, and which also illuminates a larger region to the side than the low beam, in particular on the left-hand side facing the oncoming traffic.

It is now also known from the general prior art that almost any light distribution can be produced using what is known as a matrix headlight, for example based on a matrix of light emitting diodes or laser diodes, in order to achieve the greatest possible range of vision while not dazzling the oncoming traffic, for example.

In this context, reference can be made to DE 10 2010 048 659 A1 by way of example, which describes a vehicle illumination device that enables targeted light distribution. As a result, it is possible to distribute the light in such a way that can prevent oncoming traffic from being dazzled and enable the greatest possible range of vision for a person driving the vehicle.

A method for the open-loop or closed-loop control of an external light distribution of a vehicle is known from DE 10 2012 015 618 A1. The concept, which is primarily directed to a bus, is that different light distributions can be produced in specific traffic situations. This goes beyond the low beam and high beam light distribution which is known per se, since as the bus approaches a bus stop, for example, the light distribution is pivoted in the direction of the bus stop or a potential hazard region, in order to guarantee better illumination and to ensure that objects and people in this region can be reliably recognized by the bus driver.

It is also known from the further general prior art that vehicles are increasingly fitted with environmental sensors such that the vehicle can move partly or completely autonomously based on the data from this environmental sensor system. Completely or partly autonomous driving of this kind can be achieved, in particular, on the basis of camera systems, in this case particularly stereo cameras, which can recognize objects, typically those in front of the vehicle, during a regular journey. The vehicle can then, using the data about these objects that was detected by this environmental sensor system, react accordingly and brake, swerve or the like, for example. The aforementioned cameras, in this case particularly stereo cameras, by means of which it is possible to estimate the distance to the object, have proved to be a very reliable resource for the detection of objects. In practice, however, the cameras, particularly in the dark, are dependent on the illumination from the vehicle, for example from the low beam or high beam, in order to recognize objects.

Exemplary embodiments of the present invention are directed to an improved method for the open-loop or closed-loop control of the front light distribution of a vehicle compared to the prior art.

In the method according to the invention, the vehicle has front headlights by means of which the light distribution can be changed, as described by way of example in the prior art mentioned at the outset. The vehicle also comprises an environmental sensor system that is used for at least partially autonomous driving. This environmental sensor system has at least one optical camera, which is preferably intended to be designed as a front stereo camera.

According to the invention, when the front light is switched on during an at least partially autonomous driving operation, a different light distribution is produced than during driving operation when a person is driving the vehicle. The inventor has recognized here that the light distribution requirements of a person driving the vehicle are in principle different to the light distribution requirements of an optical camera. Using different light distributions depending on whether the vehicle is being driven by a person or is driving partially or completely autonomously, it is now possible to adapt the light distribution to the specific needs of the person and the optical camera. This is used in particular to produce illumination by means of the front light distribution of the vehicle, which illumination is optimized for the camera during autonomous or partially autonomous driving. As a result, earlier recognition of objects and improved recognition of the object type and the distance to the object is made possible such that an improvement in autonomous or partially autonomous driving and particularly in safety is made possible overall.

It is usually the case that the conventional light distribution, both of the low beam and the high beam, is adapted to the typical angle of vision of a person who is driving the vehicle. The angle of vision of an adult person is typically approximately 150°, and therefore the light distribution corresponding to this angle of vision of the human eye is selected to be comparatively wide such that, as far as possible, the entire visual range of the person driving the vehicle is illuminated.

According to one very advantageous development of the method according to the invention, a smaller beam angle for the light distribution is provided for the event that the vehicle is being driven autonomously or partially autonomously, in addition to this relatively wide light distribution if a person is driving the vehicle. Compared with the angle of vision of the human eye of approximately 150°, the angle of vision of a camera is comparatively restricted to typically approximately 60° to ensure a sufficient quality of recognition. It is therefore also sufficient to implement a light distribution at a correspondingly small beam angle, because it is now not necessary to illuminate the entire angle of vision of the human eye, but only the angle of vision of the camera. However, this type of more strongly focused light beam of the light distribution now facilitates, according to one advantageous development of the method according to the invention, a greater light range than the light distribution when a person is driving the vehicle themselves. The camera can therefore see further ahead than a person could.

The environmental sensor system of a vehicle that is used for autonomous driving in practice very often has, in addition to the optical camera, at least one additional sensor, in particular a radar or lidar system, or even a laser scanner or the like. According to an extremely advantageous development of the method according to the invention, in the event that the environmental sensor system has at least one additional sensor, if an object is detected by the additional sensor, but not by the camera, the light distribution is changed in such a way that the object recognized by the additional sensor is illuminated. For instance, if the additional sensor of the environmental sensor system is a radar, it is possible to "see" a lot further than the conventional light distribution reaches and also in particular then the light distribution of the method according to the invention during autonomous driving reaches. According to this advantageous development of the method according to the invention, if an object is identified by the radar, which object for example is situated in a poorly illuminated edge region of the road, then this object detected by the additional sensor can also be illuminated by means of the front headlights and a change of the light distribution and/or by means of an additional headlight which provides a targeted focused light cone by means of a light element. An illuminated object of this kind is now reliably detected by the camera of the environmental sensor system as there is now enough light available. As a result, the recognition precision is correspondingly improved inter alia by the redundancy of the additional sensor and the camera. A distance estimation can also be carried out redundantly when a stereo camera and the radar are used.

According to another advantageous embodiment of this concept, the recognized object is not selectively illuminated when the recognized object is a moving vehicle. It would be conceivable for the oncoming vehicle or vehicle in front to be dazzled as a result. A vehicle of this kind should generally be recognized due to its own illumination, its speed of movement and its movement vectors, such that in this situation the targeted illumination can cease.

BRIEF DESCRIPTION OF THE DRAWING FIGURES

Further advantageous embodiments of the method according to the invention will become clearer from the further dependent claims and with reference to the embodiment which is described in greater detail below with reference to the drawings, in which:

DETAILED DESCRIPTION

Figure 1:
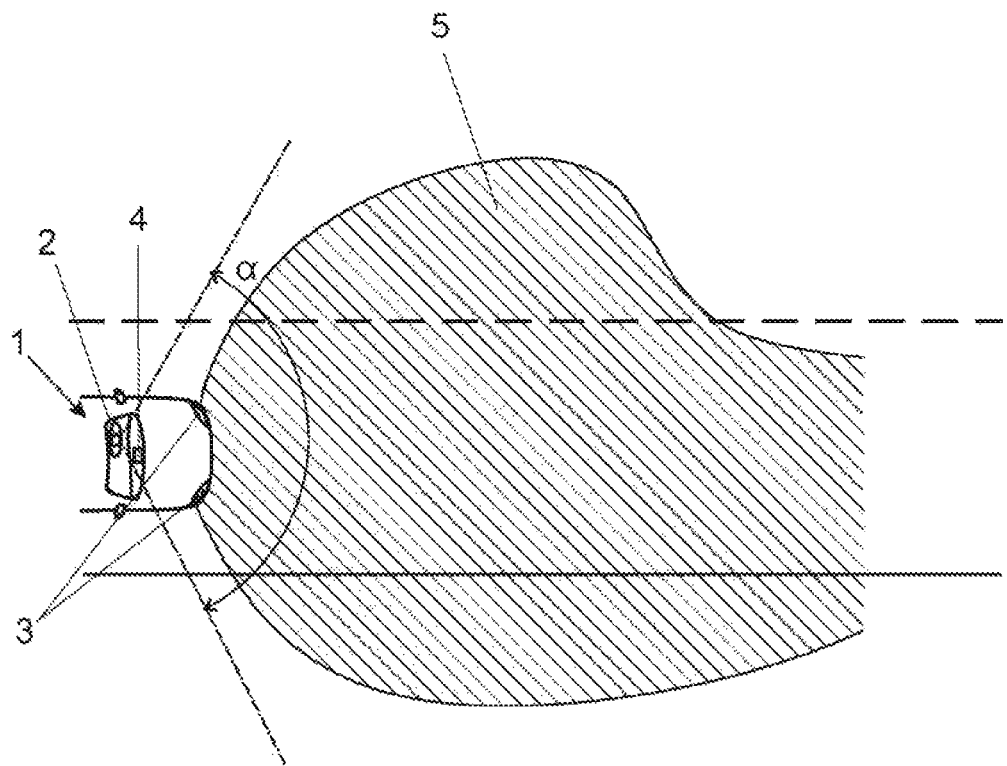
FIG. 1 is a plan view of a light distribution of front headlights of a vehicle driven by a person.

FIG. 1 is a very highly schematic view of the front part of a vehicle 1 together with a person 2 inside. The vehicle 1 has two front headlights 3, which ensure the partial light distribution 5 on the surface of the road, indicated by hatched areas, which are illustrative and not to scale. An angle of vision denoted by $\alpha$ is also depicted using a dash-dot line to indicate the angle of vision that the human eye of the person 2 typically affords. The angle of vision is in this case in the range of approximately 150°. The light distribution, which is depicted here in the high beam setting, is typically selected so as to ensure a good illumination of the angle of vision $\alpha$ of the person 2 and so as to not dazzle oncoming vehicles, for example, for which purpose the light distribution 5 in FIG. 1 has a type of recess in the upper left-hand region.

Figure 2:
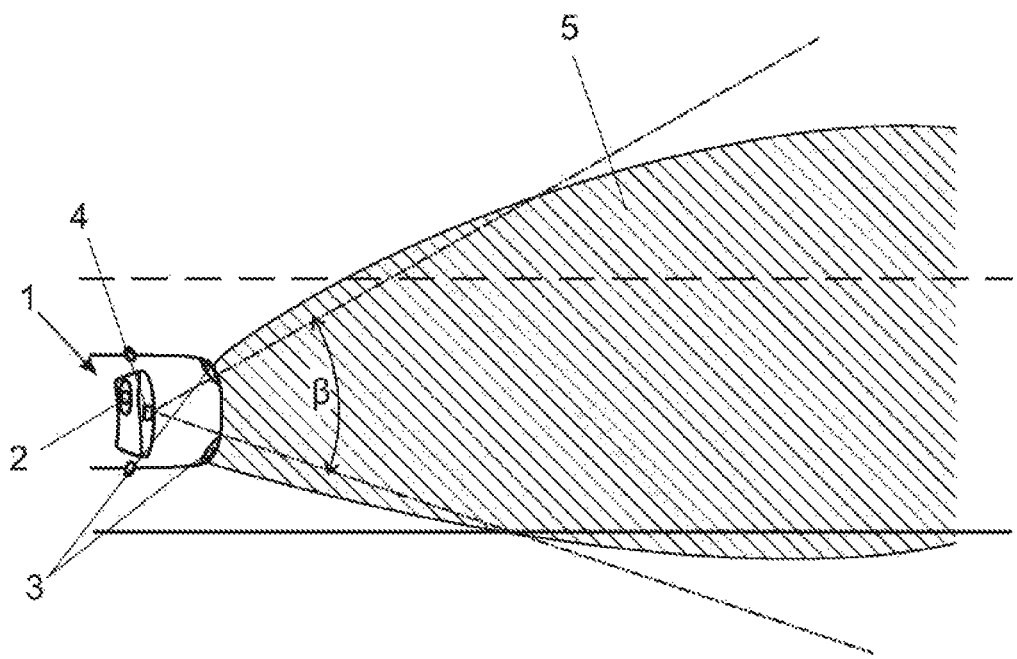
FIG. 2 is an analogous view to FIG. 1 in the event of the vehicle being driven autonomously, using an optical camera as an environmental sensor.

The vehicle 1 is also intended to be able to drive autonomously or at least partially autonomously. For this at least partially autonomous driving, an environmental sensor system is necessary, which in FIG. 2 is indicated by a front camera 4, in particular a front stereo camera 4. This camera 4 has an angle of vision $\beta$ indicated by a dash-dot-dot line, which angle is approximately 60° for example, and is therefore far smaller than the angle of vision $\alpha$ of the person 2. It is now however the case that when the light distribution is optimized for the angle of vision $\alpha$ of the person 2, more surface to the side of the vehicle 1 is illuminated than is actually necessary for the camera 4. Due to its smaller angle of vision $\beta$, the camera 4 cannot detect this region anyway.

The light distribution 5 can now be influenced by the front headlights 3 using suitable control apparatuses in the vehicle 1, which are not illustrated here but which are familiar to a person skilled in the art. This applies in particular when the front headlights 3 are designed in the form of matrix headlights, based on, for example, LEDs or lasers. Front headlights of this kind are also known as full array LED headlights or laser headlights. The light distribution 5 that can be produced by front headlights 3 of this kind is very flexible. In the view in FIG. 2 the fact that the angle of vision $\beta$ of the camera 4 is smaller than the angle of vision $\alpha$ of the person 2 is addressed. The light distribution 5 becomes smaller by comparison with the view in FIG. 1. Since the danger of dazzling other road users in the edge region of the road and oncoming road users is reduced, the light distribution 5 can be shifted to far further in front of the vehicle 1 such that ultimately a greater distance can reliably be seen by the camera 4 than by the person 2.

Figure 3:
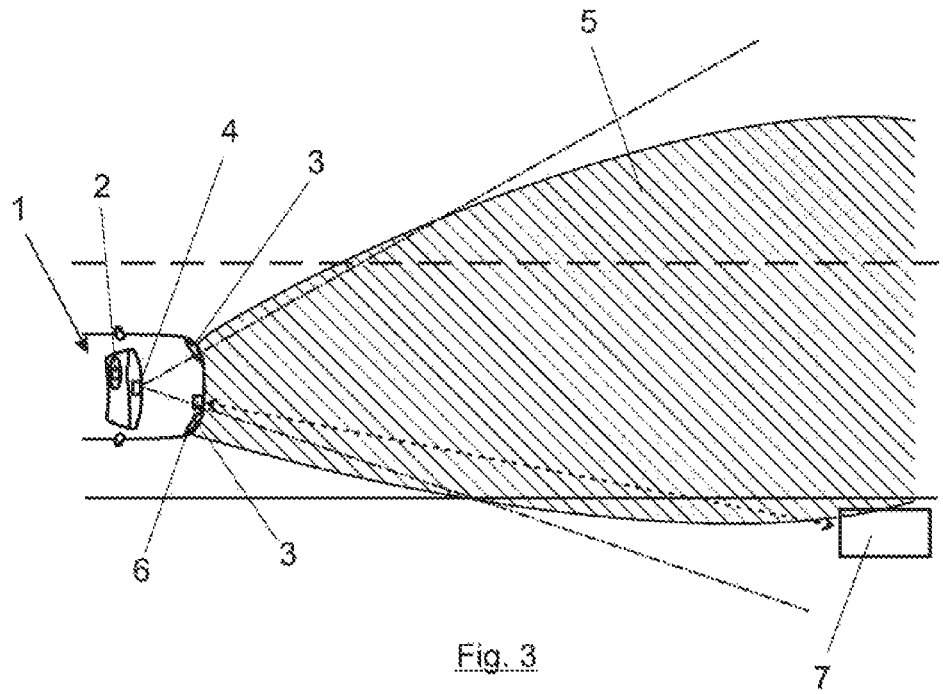
FIG. 3 is an analogous view to FIG. 2, comprising additional sensors for environmental detection and an unilluminated object.

If the vehicle 1 has an environmental sensor system for autonomous or partially autonomous driving, it is now typically the case that the vehicle uses additional sensors within the context of its environmental sensor system. FIG. 3 shows one such additional sensor as an example. In this case, the sensor is a lidar or a radar 6, for example. An environmental sensor of this kind, for example in the form of a radar 6, can see far further ahead of the vehicle 1 than the camera 4 could in the illumination that is typically available. FIG. 3 shows a purely exemplary object, denoted by 7, that is on the right-hand edge of the road, still in the angle of vision $\beta$ of the camera 4, but at least partially outside the hatched light distribution 5. This object 7 is now recognized by the radar 6. Due to the fact that it is not or not sufficiently illuminated, it cannot however be detected by the camera 4. In a situation of this kind, the control apparatuses in the vehicle 1 check whether the recognized object is highly likely to be a moving vehicle. In this case, the following method would not be used, so as not to dazzle the driver of this moving vehicle. If the object 7 is not a moving vehicle, however, in the next step this object 7 would be illuminated by a change in the light distribution 5, for example, by means of the two front headlights 3.

Figure 4:
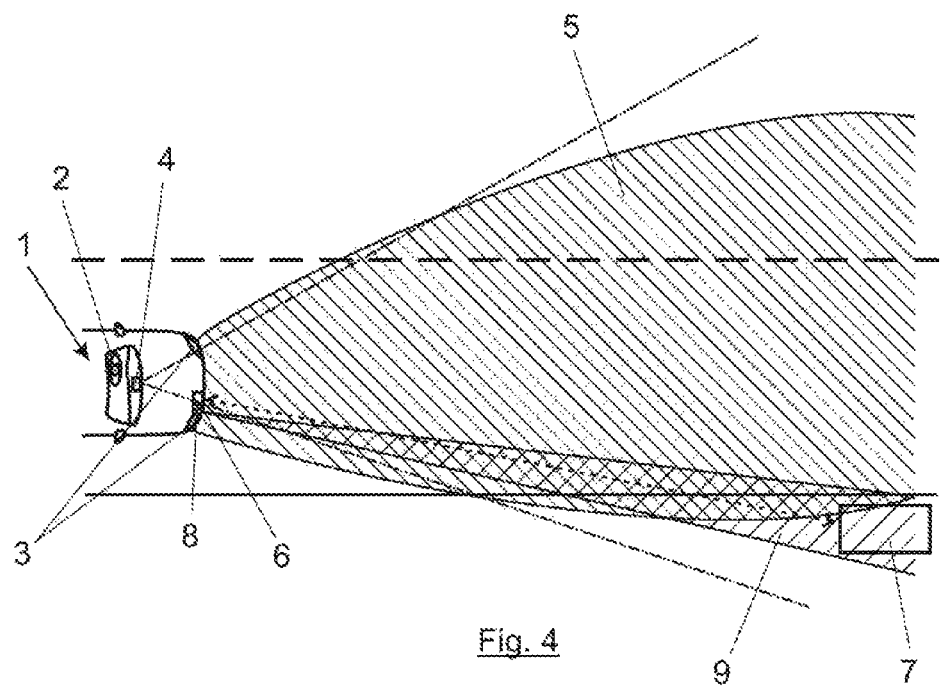
FIG. 4 is an analogous view to FIG. 3, comprising a targeted illumination of the object.

In addition or alternatively, an additional light element 8, which is shown in the view in FIG. 4 by way of example, could be used. By means of this light element 8, a targeted, highly focused light beam 9 which could be referred to as a spotlight and has a far smaller beam angle than the light distribution 5 from the two front headlights 3, can be directed in a targeted manner onto this object 7 detected by the radar 6. This is correspondingly indicated in FIG. 4. Instead of the additional light element 8, for example the spot-headlight, the light distribution 5 from the front headlights 3 could also be changed in this case and be moved towards the right, for example, or extended towards the right-hand edge.

In any case this then results in the object 7 being illuminated such that it can also be detected by the camera 4 in addition to being detected by the radar 6. This detection by the camera 4 then enables reliable detection and optionally identification of the object 7 concerned so as to be able to react quickly by swerving and/or braking for example during autonomous driving. If the object 7 is recognized as a deer standing at the edge of the road, for example, the illumination could be dimmed and the vehicle 1 slowed as a precaution, depending on the distance and movement vector of the object 7.

Using this method, the object 7 can therefore be detected by the camera 4 and recognized and optionally classified using suitable image processing in far less time than when illuminating the object detected by the additional environmental sensors 6 without targeted illumination.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for the open-loop or closed-loop control of the front light distribution of a vehicle comprising front headlights, the method comprising:
   determining whether the vehicle is operated in an at least partially autonomous driving operation; and
   adjusting a light distribution of the front headlights responsive to the determination that the vehicle is operated in the at least partially autonomous driving operation, wherein the adjusted light distribution is different from a light distribution produced when the vehicle is driven by a person,
   wherein the front headlights are configured to produce different light distributions depending on a traffic situation and the vehicle includes an environmental sensor system, which includes at least one optical camera and is used for the at least partially autonomous driving operation,
   wherein the adjusted light distribution during the at least partially autonomous driving operation, when viewed from the vehicle, has a smaller beam angle and a larger light range than when the person is driving the vehicle.

2. The method of claim 1, wherein the front headlights are LED matrix headlights or laser headlights.

3. The method of claim 1, wherein the camera is a front camera of the vehicle.

4. The method of claim 3, wherein the front camera is a stereo camera.

5. The method of claim 1, wherein a beam angle of the adjusted light distribution corresponds to an angle of vision of the at least one optical camera.

6. The method of claim 1, wherein the vehicle is on a road, the method further comprising:
   detecting, by the optical camera, an object;
   determining that the object detected by the optical camera is an animal on an edge of the road; and
   dimming the adjusted light distribution and slowing the vehicle responsive to the determination that the objected detected by the optical camera is the animal on the edge of the road.

7. A method for the open-loop or closed-loop control of the front light distribution of a vehicle comprising front headlights, the method comprising:
   determining whether the vehicle is operated in an at least partially autonomous driving operation; and
   adjusting a light distribution of the front headlights responsive to the determination that the vehicle is operated in the at least partially autonomous driving operation, wherein the adjusted light distribution is different from a light distribution produced when the vehicle is driven by a person,
   wherein the front headlights are configured to produce different light distributions depending on a traffic situation and the vehicle includes an environmental sensor system, which includes at least one optical camera and is used for the at least partially autonomous driving operation, wherein the environmental sensor system includes at least one additional environmental sensor, the method further comprising
   detecting, by the at least one additional environmental sensor, an object;
   determining that the object detected by the at least one additional environmental sensor is not detected by the at least one optical camera; and
   changing, responsive to the determination that the object detected by the at least one additional environmental sensor is not detected by the at least one optical camera, the light distribution in such a way that the object detected by the at least one additional environmental sensor is illuminated.

8. The method of claim 7, wherein the change in the light distribution is suppressed responsive to the object detected by the at least one additional environmental sensor being a moving vehicle.

9. The method of claim 7, wherein the object detected by the at least one additional environmental sensor is illuminated by an additional light element in at least one of the front headlights or in addition to the front headlights.

10. The method of claim 7, wherein the at least one additional environmental sensor is a radar or lidar sensor.

11. A method for controlling light distribution of front headlights of a vehicle, the method comprising:
   determining that the vehicle is being driven by a person;
   controlling the light distribution of the front headlights to produce a first light distribution;
   determining that the vehicle is operated in an at least partially autonomous driving operation; and
   controlling, responsive to the determination that the vehicle is operated in an at least partially autonomous driving operation, the light distribution of the front headlights to produce a second light distribution, which is different from the first light distribution,
   wherein the vehicle includes an optical camera having a smaller angle of vision than the person's angle of vision,
   wherein a beam angle of the first light distribution is larger than a beam angle of the second light distribution and a light range of the first light distribution is smaller than a light range of the second light distribution.

12. The method of claim 11, wherein the vehicle further comprises a non-optical environmental sensor, the method further comprising:

detecting, by the non-optical environmental sensor, an object;

determining that the object detected by the non-optical environmental sensor is not detected by the optical camera; and changing, responsive to the determination that the object detected by the non-optical environmental sensor is not detected by the optical camera, the light distribution in such a way that the object detected by the non-optical environmental sensor is illuminated.

13. The method of claim 11, wherein a beam angle of the second light distribution corresponds to an angle of vision of the optical camera.

14. The method of claim 11, wherein the vehicle is on a road, the method further comprising:

detecting, by the optical camera, an object;

determining that the object detected by the optical camera is an animal on an edge of the road; and dimming the second light distribution and slowing the vehicle responsive to the determination that the objected detected by the optical camera is the animal on the edge of the road.

* * * * *